Sept. 4, 1962  B. T. HUDSON  3,052,805
DRIVING MECHANISM
Filed Sept. 30, 1957  2 Sheets-Sheet 1

Sept. 4, 1962  B. T. HUDSON  3,052,805
DRIVING MECHANISM
Filed Sept. 30, 1957  2 Sheets-Sheet 2

WITNESSES
Edwin E. Baesler
James F. Young

INVENTOR
Bert T. Hudson
BY
Donald D. Smith
ATTORNEY

United States Patent Office 3,052,805
Patented Sept. 4, 1962

---

3,052,805
DRIVING MECHANISM
Bert T. Hudson, Edgewood, Pa., assignor to Westinghouse Electric Corporation, East Pittsburgh, Pa., a corporation of Pennsylvania
Filed Sept. 30, 1957, Ser. No. 686,982
13 Claims. (Cl. 310—104)

The present invention relates to a driving mechanism and more particularly to a magnetic coupling employed therewith.

There are many applications wherein it is desired to actuate a component disposed within an hermetically sealed system by means of a driving mechanism disposed generally at a position exterior to the system. In dealing with hazardous or corrosive fluids employed within such systems, there frequently are instances wherein because of the nature of these fluids it is essential to maintain all leakage from the system essentially at zero. For this reason the extension of driving shafts and other components of the driving mechanism or of the component being driven thereby into the hermetically sealed system is impractical due to inevitable leakage occurring at various packing glands or shaft seals, or the like, associated with the driving mechanism. As is well known, leakage at these areas usually develops after a period of operation due to wear or due to the corrosive or erosive nature of the systemic fluid contacting these sealing devices. These problems are complicated still further when the fluid is subjected to extremely high pressures and temperatures.

One solution of this problem which has been proposed heretofore employs the obvious expedient of hermetically sealing the driving mechanism within a housing which, in turn, is hermetically sealed to the system in communication therewith. Although the operation of this arrangement is satisfactory in many cases, it suffers from the disadvantages that disassembly of the portion of the driving mechanism so enclosed for maintenance or repair is difficult and time consuming. Additionally, in those applications wherein the driven component must be rotated at a very low speed, complicated structures are required in order to operate the driving mechanism without undue loss of torque. In one example, a rotor of an electric motor is sealed within the system and is separated from the stator of the motor by means of suitable rotor and stator enclosures or cans. In this arrangement it is necessary to apply a very low frequency alternating potential to the stator in order to rotate the rotor at a desired very low speed. Because the rotor is immersed in the fluid of the sealed system, it is virtually impossible to couple a suitable speed reducing gearing train to the rotor due to the lubricational problems involved.

Although magnetic coupling arrangements are well known, these prior arrangements are complicated and utilize a relatively large number of parts in order to secure adequate operating torque in the applications wherein they were realized. Moreover, these prior arrangements employed relatively thin diaphragms or sealed enclosures between the driving and driven components of the coupling which are, of course, unsuitable for use in conjunction with sealed systems maintained at elevated pressures, for an example in the neighborhood of 2000 to 3000 pounds per square inch.

In view of the foregoing, it is an object of the present invention to provide a novel and more efficient magnetic coupling.

Another object of the invention is to provide a novel and more efficient driving mechanism for use in conjunction with a hermetically sealed or highly pressurized system.

A further object of the invention is to provide a driving mechanism with means for conveniently and hermetically sealing the driven components associated therewith.

Still another object of the invention is to provide a driving mechanism adapted for use in conjunction with an hermetically sealed system with means for operating the driving mechanism at a desired slow speed.

A still further object of the invention is to provide a driving mechanism adapted for use in conjunction with a sealed system and having a minimum of component parts.

These and other objects, features and advantages of the invention will be made apparent during the ensuing description thereof, when taken in conjunction with the accompanying drawing wherein.

In accordance with the invention a driven component is sealed within a sealed system and is rotated in a manner similar to that of a windingless rotor associated with certain types of electric motors. The field of the motor, as it were, is formed from an electromagnet or a permanent magnet, as desired, and is rotated at a position adjacent that of the aforesaid driven component but exterior to the sealed system. This field magnet then is rotated at a desired speed by a suitable driving means and the driven component is so arranged that it substantially follows the rotating field magnet.

Figure 1:
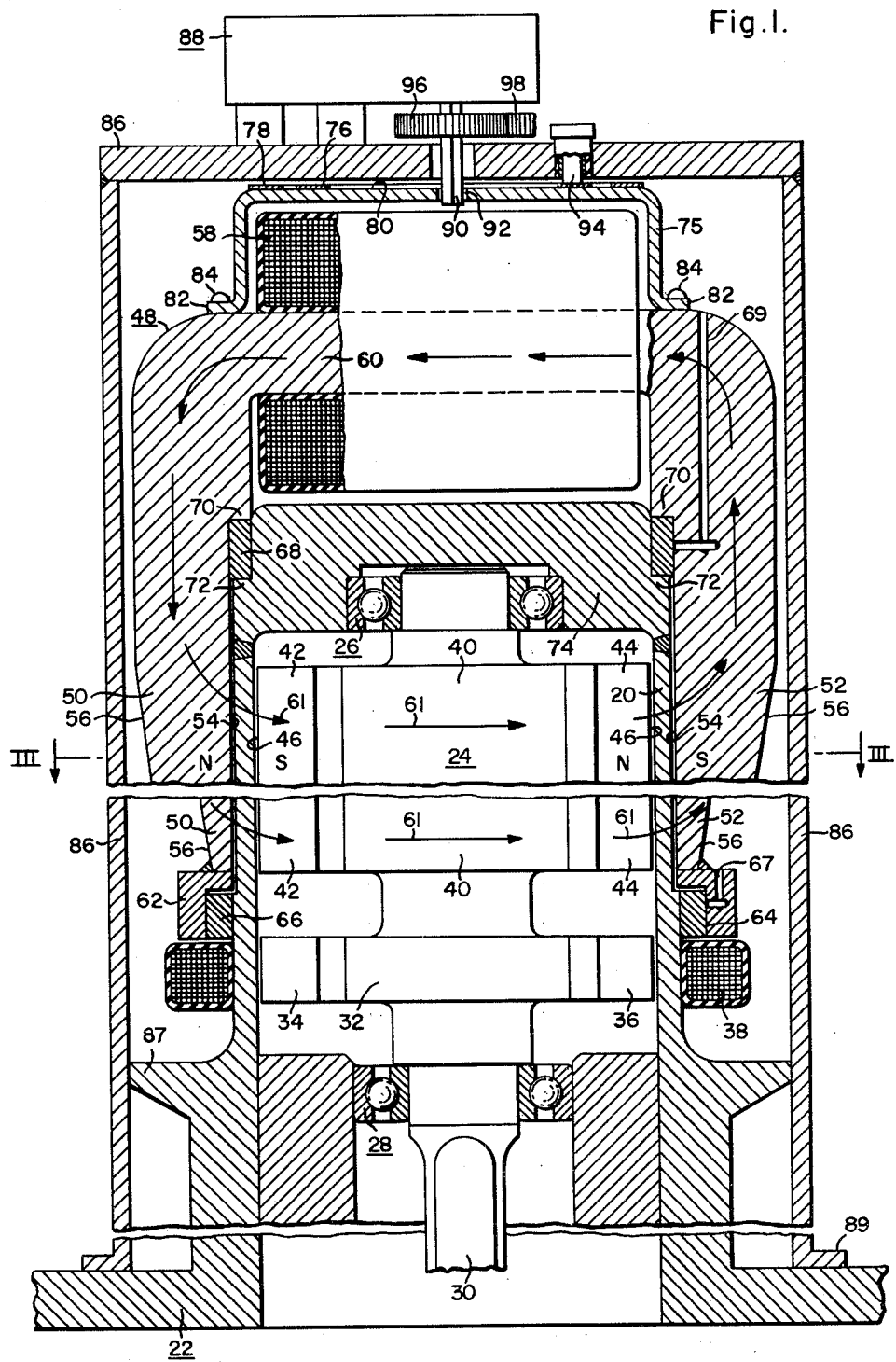
FIGURE 1 is a longitudinally sectional view of one form of driving mechanism and magnetic coupling arranged in accordance with the invention.
Figure 2:
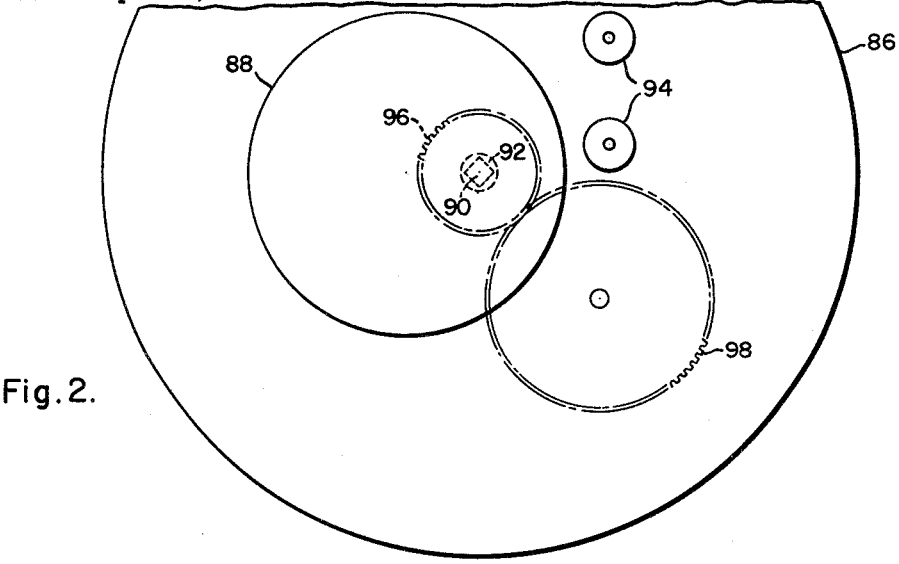
FIG. 2 is a top plan view of the driving mechanism illustrated in FIG. 1.
Figure 3:
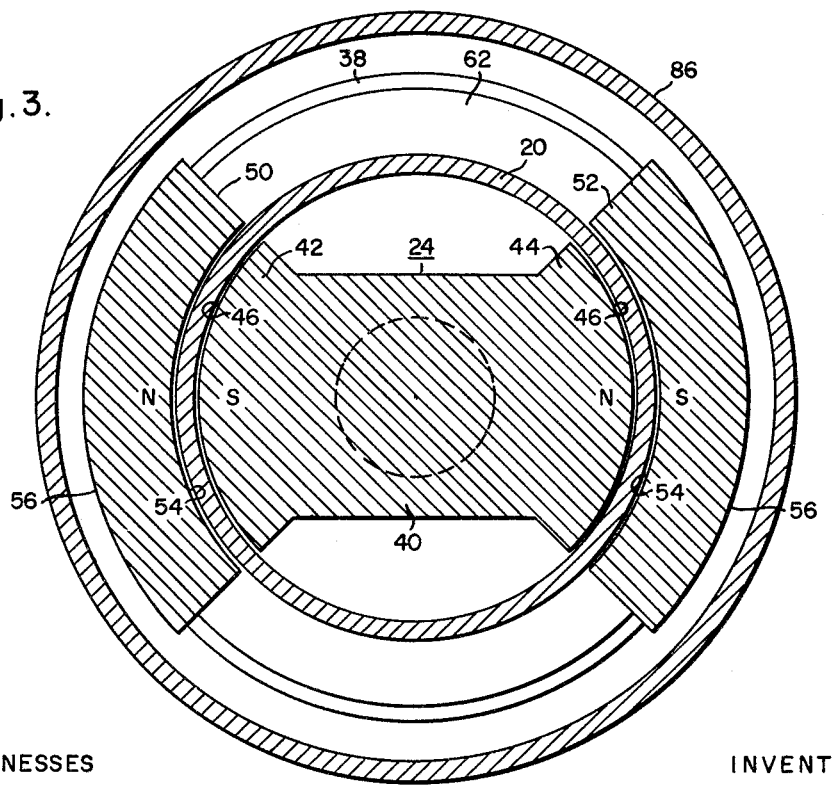
FIG. 3 is a cross-sectional view of the driving mechanism shown in FIG. 1 and taken along lines III—III thereof.

Referring now more particularly to FIGS. 1 to 3 of the drawings, the illustrative form of the invention as shown therein comprises a pressurized hermetically sealed generally cylindrical enclosure 20 which is secured to and communicates at one end with a hermetically sealed vessel or container denoted generally by the reference character 22. The enclosure 20 desirably is fabricated from a magnetic material, and in high pressure applications wherein the enclosure is of necessity, relatively thick, the enclosure is formed from a material of intermediate permeability, to avoid short-circuiting the magnetic flux between adjacent rotor poles. A driven member, including in this example a salient pole rotor 24, is mounted for rotation within the enclosure 20 and the outer periphery of the rotor 24 is closely spaced relative to the inner surface of the enclosure 20. The rotor 24 is mounted adjacent its ends respectively upon suitable antifrictional means including, for example the ball bearing arrangements 26 and 28. To the lower end of the rotor 24, as seen in FIG. 1, a suitable driving shaft 30 is secured and is arranged to actuate another movable member (not shown) sealed within the aforementioned system, for example, a pump impeller, an agitator, or the like. In other applications the movable member can take the form of an element or actuator for controlling one or more valve means associated with the system or for otherwise controlling the system. In some cases the valve mechanism or other element is operated by means of a lead screw (not shown) coupled to the rotor, and the rotor is rotated at a very slow rate in order to advance or to withdraw the element at a desired slow speed.

Likewise disposed adjacent the lower end of the rotor 24 is a position indicating disc 32 which is furnished with salient poles 34 and 36, generally similar to those supplied for the body of the rotor 24 in a manner presently to be described. The position indicating arrangement can be utilized for example, when the rotor is being employed to actuate a valve or the like by means of the aforementioned lead screw. A position indicating coil 38 is mounted on the exterior surface of the enclosure 20 at a position juxtaposed to the position indicating disc 32. The coil 38 is coupled to well-known counting circuitry for recording the electrical pulses induced within the coil upon each passage of the salient poles 34 and 36 of the rotor 24 adjacent thereto. By counting these pulses for a given time the total number of revolutions of the rotor 24 from that time is found, and thereby an indication of position of the component being driven by the rotor 24 is obtained.

The body portion 40 of the rotor 24 likewise is provided with salient magnetic poles 42 and 44 and is spaced from the position indicating disc 32 for reasons hereinafter made apparent. The magnetic poles 42 and 44 in this example are disposed at diametrically opposed positions relative to the body of the rotor 24. It will be obvious that the rotor 24 can be provided with additional magnetic poles (not shown), depending upon the torque to be applied to the coupling. Thus four, six, or more of these rotor poles can be furnished with a corresponding number of poles being provided in the rotating field structure, presently to be described. The exterior surfaces 46 of each of the main rotor poles 42 and 44 have a cylindrical configuration imparted thereto so that these outer surfaces will be closely spaced from the cylindrical enclosure or housing 20. In this manner the "air gap" of the magnetic coupling is kept as small as possible, as dictated primarily by the thickness of the pressurized enclosure 20.

In this arrangement of the invention a rotatable field structure is mounted exteriorly of the sealed enclosure 20 but at a position which is juxtaposed to the rotor poles 42 and 44. The rotating field can be formed from a permanent magnet or from an electromagnet presently to be described. In this example the field additionally is formed with a pair of salient poles which are adapted to cooperate respectively with the magnetic poles 42 and 44 of the rotor 24 in order to actuate the latter.

One form of the aforementioned rotating field comprises an inverted U-shaped magnet 48, the two legs 50 and 52 of which form the salient magnetic poles of the rotating field. As better shown in FIG. 3, these poles 50 and 52 are each provided with a cylindrical surface 54 at their inner peripheries in order to closely fit the exterior surface of the sealed enclosure or housing 20 of the rotor 24. Obviously, two or more of the U-shaped magnets 48 can be employed by mounting these magnets, desirably, in a coaxial, circumferentially displaced relationship, such that their poles are spaced desirably equidistantly about the rotating field structure. The outer surface 56 of each of the field poles 50 and 52 is tapered upwardly and outwardly in order to lend strength to the U-shaped member 48 and, more particularly, to distribute the flow of magnetic flux evenly along the length of the rotor 24. The U-shaped member is fabricated from a magnetic material which can be permanently magnetized or alternatively, which can be magnetized as desired by energizing an electromagnet coil 58 wound about the crosspiece 60 of the U-shaped magnet 48. It is contemplated also that one or more of the U-shaped magnets (not shown) can be mounted for planetary movement about the rotor 24 in positions whereat the pole pieces (50 and 52) thereof are substantially perpendicular to the axis of rotation of the rotor.

As better shown in FIG. 3 of the drawings, the north and south field poles 50 and 52 cooperate respectively with the south and north rotor poles 42 and 44. The lines of magnetic flux induced in the U-shaped magnet 48, which form a magnetic circuit through the field magnet 48 and rotor 24, as shown by arrows 61 (FIG. 1), maintain the rotor 24 in synchronism with the rotating magnet 48 when the magnetic coupling is operated.

To the lower ends of the field poles 50 and 52 of the U-shaped member is secured a non-magnetic supporting annulus 62, which thus continuously encircles the sealed enclosure 20. A groove 64 is formed in the inner surface of the supporting annulus 62 and into this groove, when the U-shaped member 48 is mounted in its operative position, is inserted an annular journal bearing arrangement indicated generally by the reference character 66. The bearing 66, in this arrangement is secured to the outer periphery of the rotor enclosure 20 and serves to space the adjacent end portions of the poles 50 and 52 in a substantially coaxial relation to the enclosure 20 and the rotor 24. In a similar manner the upward portions of the U-shaped member 48 are supported coaxially of the enclosure 20 and the rotor 24 by means of another annular bearing 68. The latter mentioned bearing is confined between an inwardly extending shoulder 70 formed adjacent the upward ends of the poles 50 and 52 and an outwardly extending shoulder 72 extending around an end enclosure 74 which is welded to the upper end of the housing or enclosure 20. The closure 74 preferably is formed from a non-magnetic material in order to avoid by-passing any magnetic flux relative to the rotor 24. With this arrangement the weight of the U-shaped member 48 is borne by the horizontal surfaces of the bearing 68 and of the shoulders 70 and 72, when the magnetic coupling is mounted in a vertical position. Additionally, the U-shaped member is maintained coaxially of the enclosure 20 and of the rotor 24 mounted therewithin. Lubricant is supplied to the bearings 66 and 68 through the passages 67 and 69, respectively, which are formed in the field magnet 48.

The crosspiece 60 of the U-shaped member 48 is provided as indicated heretofore with the electromagnet coil 58. Surrounding the top portion of the electromagnet is a generally cup-shaped housing 75. The housing 75 is furnished with a pair of annular contacting members 76 and 78 which are disposed in concentric relation on the top surface 80 of the housing 75. At the open end of the housing 75 an outwardly extending flange 82 is formed whereby the housing is secured to the rotatable U-shaped member 48 by means, for example, of a plurality of mounting bolts 84.

The U-shaped magnet 48, the rotor 24 and associated components including the housing 74 and the upper portion of the rotor housing 20 are enclosed within a tubular casing member 86. The casing fits loosely over the aforesaid components and is spaced therefrom by means of an outwardly extending flange 87 secured to the rotor housing 20. The casing is maintained in this operating position by an annular stop 89 mounted on the vessel 22 and engaging the lower open end of the casing 86. With this arrangement, then, the casing 86 can be removed easily as explained hereinafter, for ready access to the components enclosed therein in the event maintenance, repair, or replacement thereof becomes necessary.

Mounted atop the casing 86 is a suitable driving means, for example, an electric motor and associated gearing indicated generally by the reference character 88 and adapted to rotate a driving shaft 90 associated therewith at a desired speed. The driving shaft 90 is provided with a square or other keyed configuration adjacent its outer or lower end which is inserted into a complementary and relatively closely fitting opening 92 formed in the coil housing 75 desirably at the center thereof. With this arrangement, upon energizing the motor and gearing arrangement 88, the U-shaped field magnet 48 can be rotated at a very slow speed or other desired speed. Also mounted in the top portion of the casing 86 is a pair of spring biased brushes 94 which are adapted to engage continuously the annular contacting members 76 and 78, respectively, in order to supply electric potential to the electromagnet 58. The use of the aforedescribed detachable shaft connection with the coil housing 75, and the use of the brushes 94, permit facile removal of the driving means 88 and the casing 86 from the remaining components of the magnetic coupling arrangement. The driving shaft 90 further is provided with a gear 96 whereby the driving shaft is coupled, through a suitable gearing train 98 or the like, to suitable counting means or limit switches as desired for determining the operation of the U-shaped magnet 48.

In view of the foregoing it will be apparent that novel and efficient forms of a magnetic coupling or driving means have been disclosed herein. By rotating the U-shaped field magnet 48, the rotor 24 of the driving means or coupling can be moved at a very slow speed without the incorporation of gear trains and the like within the hermetically sealed housing 20. Furthermore, due to the configuration of the inverted U-shaped magnet 48 and of the rotor 24, the components of the magnetic coupling can be actuated without undue loss of torque between these components.

It should be noted that the descriptive matter employed herewithin is intended only to exemplify the invention and therefore should not be interpreted as limitative thereof inasmuch as numerous embodiments of the invention will occur to those skilled in the art without departing from the spirit and scope of the invention.

I claim as my invention:

1. A magnetic coupling comprising a housing, a rotor member having magnetic poles and mounted for rotation within said housing, at least one magnetic generally U-shaped member mounted exteriorly of said housing, said member including a pair of pole pieces extending along said housing at positions juxtaposable with said rotor, means for moving said U-shaped member about said housing, an anti-frictional means disposed between said housing and said pole pieces for rotatably mounting said member on said housing.

2. A magnetic coupling comprising a housing, a rotor mounted for rotation within said housing, said rotor having magnetic poles, at least one magnetic generally U-shaped member mounted for rotation exteriorly of said housing, said U-shaped member terminating in a pair of pole pieces extending along said housing at positions of juxtaposable relation with said rotor poles, the free ends of said pole pieces being coupled to an annular supporting member, means for rotating said U-shaped member, and anti-frictional means disposed between said annular supporting member and said housing.

3. Driving means comprising a housing, a rotor mounted for rotation within said housing, said rotor having magnetic poles, at least one magnetic generally U-shaped member mounted exteriorly of said housing for movement thereabout, said member having a pair of pole pieces extending along said housing at positions of juxtaposable relation with said rotor and having a crosspiece connecting said pole pieces, an electromagnetic coil wound upon said crosspiece, a housing enclosing said coil and secured to said member, annular contacting means disposed in insulated relation atop said coil housing, circuit means for connecting said contacting means to said coil and to a source of electric potential, and means for moving said U-shaped member about said housing.

4. Driving means comprising a housing, a rotor having magnetic poles mounted for rotation within said housing, at least one generally U-shaped magnetic member mounted exteriorly of said housing and having pole pieces extending along said housing at positions of juxtaposable relation with said rotor poles, anti-frictional means disposed between said U-shaped member and said housing, said U-shaped member being spaced from said housing and being supported by said anti-frictional means, an electromagnetic coil associated with said U-shaped member, a housing for said coil secured to said U-shaped member, a removable casing for enclosing said U-shaped member and said coil housing, motive means including a driving shaft mounted atop said casing, said driving shaft extending through an opening in said casing and having a keyed configuration inserted into a complementary aperture formed in said coil housing, and spacing means associated with said housing and engageable with said removable casing at the operating position thereof.

5. A magnetic coupling comprising a housing, a rotor mounted for rotation within said housing, said rotor having magnetic poles, a rotatable field magnet movably mounted exteriorly of said housing, said field magnet having pole pieces arranged in positions of juxtaposable relation with said rotor poles, an antifrictional means disposed between said pole pieces and said housing for rotatably mounting said field magnet on said housing, and means for rotating said field magnet.

6. A magnetic coupling comprising a housing, a magnetic rotor mounted for rotation within said housing, said rotor having magnetic poles, a rotatable field magnet movably mounted exteriorly of said housing, said field magnet having pole pieces arranged in positions of juxtaposable relation with said rotor poles, the free ends of said pole pieces being coupled to an annular supporting member, means for rotating said field magnet, and anti-frictional means disposed between said supporting member and said housing to space said supporting member and said pole pieces from said housing.

7. Driving means comprising a rotor having magnetic poles, at least one magnetic generally U-shaped member mounted coaxially of said rotor, said member having a pair of pole pieces extending longitudinally of said rotor in juxtaposable relation with said rotor poles and having a crosspiece connecting said pole pieces, an electromagnetic coil wound upon said crosspiece, a housing for said coil, a pair of annular contacting members disposed in insulated relation atop said housing, circuit means for connecting said contacting means to said coil and to a source of electric potential, and means for moving said U-shaped member about the axis of said rotor.

8. A magnetic coupling comprising a housing, an elongated rotor having magnetic poles extending longitudinally thereof, means for rotatably mounting said rotor within said housing, at least one magnetic generally U-shaped member mounted exteriorly of said housing, said U-shaped member having a pair of pole pieces extending longitudinally of said rotor at positions of juxtaposable relation with said rotor poles, said pole pieces being tapered toward their free ends to distribute magnetic flux along said rotor poles and said pole pieces, an annular supporting member secured to said free ends of the pole pieces and surrounding said housing, and anti-frictional means disposed between said supporting member and said housing, said anti-frictional means spacing said supporting member and said pole pieces from said housing.

9. Driving means comprising a housing, a rotor mounted for rotation within said housing and having magnetic poles, a rotatable field magnet mounted exteriorly of said housing, said field magnet having pole pieces arranged in positions of juxtaposable relation with said rotor poles, a removable casing generally surrounding said field magnet, motive means mounted on the outer surface of said casing, and driving linkage connected to said motive means and extending through an opening in said casing, said driving linkage having a keyed configuration inserted into a complementary aperture formed in said field magnet to engage detachably said magnet.

10. Driving means comprising a housing, a rotor mounted for rotation within said housing and having magnetic poles, a rotatable field magnet mounted exteriorly of said housing, said field magnet having spaced pole pieces arranged in positions of juxtaposable relation with said rotor poles, a core member connecting said pole pieces, an electromagnetic coil associated with said core member, a housing for said coil secured to said field magnet, a removable casing for enclosing said field magnet and said said coil housing, and motive means including driving linkage mounted on said casing, said driving linkage extending through an opening in said casing and having a keyed configuration inserted into a complementary aperture formed in said coil housing.

11. Driving means comprising a housing, a rotor mounted for rotation within said housing and having magnetic poles, a rotatable field magnet mounted exteriorly of said housing, said field magnet having spaced pole pieces arranged in positions of juxtaposable relation with said rotor poles, a core member connecting said pole pieces, an electromagnetic coil associated with said core member, a housing for said coil secured to said field magnet, a removable casing for enclosing said field magnet and said coil housing, motive means including driving linkage mounted on said casing, said driving linkage extending through an opening in said casing and having a keyed configuration inserted into a complementary aperture formed in said coil housing, annular contacting means disposed in insulated relation on said coil housing, and circuit means for connecting said contacting means to said coil and to a source of electric potential.

12. A magnetic coupling comprising a rotor having magnetic poles, means for rotatably mounting said rotor, a field magnet mounted coaxially of said rotor, said field magnet having pole pieces arranged in positions of juxtaposable relation with said rotor poles, a core member connecting said pole pieces, an electromagnetic coil associated with said core member, a housing for said coil secured to said field magnet for rotation therewith, annular contacting means disposed in insulated relation on the outer surface of said coil housing, circuit means for connecting said contacting means to said coil and to a source of electric potential, and means for rotating said field magnet.

13. A magnetic coupling comprising an elongated housing, a rotor mounted longitudinally of said housing for rotation therewithin, said rotor having magnetic poles, at least one magnetic generally U-shaped member mounted for rotation exteriorly of said housing, said member having a pair of pole pieces extending longitudinally of said housing at positions of juxtaposable relation with said rotor poles, a crosspiece connecting adjacent ends of said pole pieces, an annular supporting member surrounding said housing and joined to the other adjacent ends of said pole pieces, anti-frictional means mounted on said housing adjacent one end thereof and engaging said U-shaped member, additional anti-frictional means mounted adjacent the other end of said housing and engaging said annular supporting member, said U-shaped member being rotatably mounted upon said housing by said anti-frictional means, and means for rotating said U-shaped member.

References Cited in the file of this patent

UNITED STATES PATENTS

| | | |
|---|---|---|
| 1,308,435 | Maire | July 1, 1919 |
| 1,847,006 | Kalischer | Feb. 23, 1932 |
| 2,463,409 | Moody | Mar. 1, 1949 |
| 2,536,089 | Ratchford | Jan. 2, 1951 |
| 2,592,496 | Vigh | Apr. 8, 1952 |
| 2,705,762 | Pile | Apr. 5, 1955 |
| 2,885,126 | Hudson | May 5, 1959 |

FOREIGN PATENTS

| | | |
|---|---|---|
| 940,722 | Germany | Mar. 22, 1956 |